US008636069B2

(12) United States Patent
Reddy et al.

(10) Patent No.: US 8,636,069 B2
(45) Date of Patent: Jan. 28, 2014

(54) WELLBORE SERVICING FLUID COMPOSITIONS AND USE THEREOF

(75) Inventors: B. Raghava Reddy, Duncan, OK (US); Ron James Crook, Duncan, OK (US); Larry S. Eoff, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 365 days.

(21) Appl. No.: 12/564,562

(22) Filed: Sep. 22, 2009

(65) Prior Publication Data

US 2011/0067867 A1 Mar. 24, 2011

(51) Int. Cl.
*E21B 43/27* (2006.01)

(52) U.S. Cl.
USPC .............. 166/300; 166/293; 166/294

(58) Field of Classification Search
None
See application file for complete search history.

(56) References Cited

U.S. PATENT DOCUMENTS

| | | | |
|---|---|---|---|
| 2,174,027 A | 9/1939 | Ball | |
| 2,211,688 A | 8/1940 | Byck et al. | |
| 2,782,190 A | 2/1957 | Fischer et al. | |
| 3,208,524 A | 9/1965 | Horner et al. | |
| 3,861,467 A * | 1/1975 | Harnsberger | 166/276 |
| 4,579,175 A * | 4/1986 | Grodde et al. | 166/295 |
| 4,588,506 A * | 5/1986 | Raymond et al. | 210/606 |
| 5,144,016 A | 9/1992 | Skjak-Braek et al. | |
| 5,268,112 A * | 12/1993 | Hutchins et al. | 507/217 |
| 5,346,012 A | 9/1994 | Heathman et al. | |
| 5,473,059 A * | 12/1995 | Yeh | 536/18.7 |
| 5,563,186 A * | 10/1996 | Thompson | 523/130 |
| 5,588,488 A | 12/1996 | Vijn et al. | |
| 5,596,084 A * | 1/1997 | Sanderson et al. | 536/3 |
| 5,671,581 A | 9/1997 | Nagahama | |
| 6,413,494 B1 * | 7/2002 | Lee et al. | 424/9.1 |
| 6,981,552 B2 | 1/2006 | Reddy et al. | |
| 7,007,752 B2 | 3/2006 | Reddy et al. | |
| 7,077,203 B1 | 7/2006 | Roddy et al. | |
| 7,368,488 B2 | 5/2008 | Nishikawa et al. | |

(Continued)

FOREIGN PATENT DOCUMENTS

| | | |
|---|---|---|
| WO | 9611230 A1 | 4/1996 |
| WO | 2011012922 A1 | 2/2011 |

OTHER PUBLICATIONS

Sriamornsak, Pornasak, Chemistry of Pectin and Its Pharmaceutical Uses: A Review, Silpakorn University International Journal, vol. 3 (No. 1-2) 2003 pp. 207-228.*

(Continued)

*Primary Examiner* — Shane Bomar
*Assistant Examiner* — Silvana Runyan
(74) *Attorney, Agent, or Firm* — Craig Roddy; Conley Rose, P.C.

(57) ABSTRACT

A method of servicing a wellbore in contact with a subterranean formation comprising placing a wellbore servicing fluid comprising a polyuronide polymer within the wellbore, contacting the wellbore servicing fluid with a divalent ion source, and allowing the wellbore servicing fluid to form a gel within the wellbore wherein the divalent ion source is located within the wellbore. A method of servicing a wellbore in contact with a subterranean formation comprising (a) placing a wellbore servicing fluid comprising a polyuronide polymer into the wellbore wherein the wellbore servicing fluid contacts a calcium ion source, (b) shutting the wellbore and allowing the servicing fluid to set into place for a period of time, and (c) repeating steps (a) and (b) until the permeability of a structure within the wellbore is reduced by about 50%.

24 Claims, 5 Drawing Sheets

(56) References Cited

U.S. PATENT DOCUMENTS

| | | |
|---|---|---|
| 7,384,892 B2 | 6/2008 | Melbouci et al. |
| 7,629,296 B2* | 12/2009 | Dahanayake et al. ......... 507/110 |
| 2005/0137272 A1* | 6/2005 | Gaserod et al. ................ 521/50 |
| 2006/0231255 A1* | 10/2006 | Oyler et al. ................... 166/295 |
| 2007/0111897 A1* | 5/2007 | Dahanayake et al. ......... 507/211 |
| 2010/0032160 A1* | 2/2010 | Wilson et al. ................ 166/282 |

OTHER PUBLICATIONS

Sriamornsak, Pornasak, Chemistry of Pectin and Its Pharmaceutical Uses: A Review, (Date).*

CPKelco Huber Company brochure entitled, "Best choices guidelines—personal care products," XP-002612487, undated but listed in International Search Report of related counterpart application PCT/GB2010/001769, 4 pages.

Foreign communication from a related counterpart application—International Search Report and Written Opinion, PCT/GB2010/001769, Dec. 16, 2010, 14 pages.

Nyland, T., et al., "Additive effectiveness and contaminant influence on fluid-loss control in water-based muds," Jun. 1988, pp. 195-203, SPE Drilling Engineering.

* cited by examiner

A    B    C

WELLBORE SERVICING FLUID COMPOSITIONS AND USE THEREOF

FIELD

This disclosure relates to fluid compositions for servicing a wellbore. More specifically, this disclosure relates to wellbore servicing fluid compositions comprising polyuronides and their applications.

BACKGROUND

A natural resource such as oil or gas residing in a subterranean formation can be recovered by drilling a well into the formation. The subterranean formation is usually isolated from other formations using a technique known as cementing. In particular, a wellbore is typically drilled down to the subterranean formation while circulating a drilling fluid through the wellbore. After the drilling is terminated, a string of pipe, e.g., casing, is run in the wellbore. Primary cementing is then usually performed whereby a cement slurry is pumped down through the string of pipe and into the annulus between the string of pipe and the walls of the wellbore to allow the cement slurry to set into an impermeable cement column and thereby seal the annulus. Subsequent secondary cementing operations, i.e., any cementing operation after the primary cementing operation, may also be performed.

One example of a secondary cementing operation is squeeze cementing whereby a cement slurry is forced under pressure to areas of lost integrity in the annulus to seal off those areas. Squeeze cementing is a remedial operation used to accomplish different objectives. For example squeeze cementing may be carried out in order to isolate a producing zone from zones which produce unwanted fluids; to seal of thief zones or loss circulation zones; to seal off perforations in zones which have been depleted; to fix corroded casing leaks; to prevent fluid migration in abandoned zones and wells; and/or to correct defects resulting from primary cementing jobs such as microannuli formation or the presence of flow channels. The latter four situations are typically encountered in zones which have casing and cement behind the casing. Squeeze cementing may be carried out in order to mitigate or correct for materials lost due to the presence of perforations that extend through the casing and cement, or to prevent the flow of unwanted fluids such as water into the well bore subsequent to depletion of the oil in the perforated and fractured zone. Casing leaks due to holes caused by corrosion may also allow unwanted formation fluids to be co-produced with the desired fluid, or allow for interzonal fluid communication. Additional adverse conditions that may be ameliorated by squeeze cementing include for example sustained casing pressure build up. Sustained casing pressure build up at the well head in producing or abandoned wells may be attributable to a number of factors such as fluid migration behind a casing through channels in cement column, or the presence of microannuli between the casing and cement, or between the cement and the formation. Sustained casing pressure build up can pose a number of hazards. Further, such casing pressure build ups can be economically disadvantageous as governmental agencies require the pressure build up not to exceed beyond some set values in abandoned wells. In producing wells, the sustained casing pressure build up may lead to casing and shoe failures. In injection and disposal wells, the presence of alternate flow paths in cased and cemented zones may lead to loss of injection pressures and fluid flow into undesired locations.

Alternate solutions to squeeze cementing include procedures to seal and plug the undesired fluid flow paths by injecting gelling fluids, pressure activated fluids and by mechanical isolations. All of these procedures including squeeze cementing are complex, laborious and frequently require multiple treatments to fix the problems. For example, the use of gelled fluids requires repeated experimentation to optimize the gel time which is dependent on a number of factors such as downhole temperatures and the ratio of components. Thus, there is a need for compositions which are simpler to use and formulate that can ameliorate the aforementioned adverse conditions.

Additionally, oil or gas residing in the subterranean formation may be recovered by driving the fluid into the well using, for example, a pressure gradient that exists between the formation and the wellbore, the force of gravity, or displacement of the fluid using a pump or the force of another fluid injected into the well or an adjacent well. The production of the fluid in the formation may be increased by hydraulically fracturing the formation. That is, a viscous fracturing fluid may be pumped down the casing to the formation at a rate and a pressure sufficient to form fractures that extend into the formation, providing additional pathways through which the oil or gas can flow to the well. Unfortunately, water rather than oil or gas may eventually be produced by the formation through the fractures therein, and such fluids may enter the wellbore through perforations in the production zone, or through high permeability channels in the case of a open hole production zone. To provide for the production of more oil or gas, a fracturing fluid may again be pumped into the formation to form additional fractures therein. However, the previously used fractures and associated fluid pathways first must be plugged to prevent the loss of the fracturing fluid into the formation via those fractures.

In addition to the fracturing fluid, other fluids used in servicing a wellbore may also be lost to the subterranean formation while circulating the fluids in the wellbore. For example, a drilling fluid may be lost to the formation, resulting in the circulation of the fluid in the wellbore being too low to allow for further drilling. Additionally, wellbore fluids used in injection wells to enhance hydrocarbon recovery or fluids designated for disposal may also be lost to the subterranean formation. Also, a secondary cement/sealant composition may be lost to the formation as it is being placed in the wellbore, thereby rendering the secondary operation ineffective in maintaining isolation of the formation.

In particular, the fluids may enter the subterranean formation via depleted zones, zones of relatively low pressure, lost circulation zones having naturally occurring fractures, weak zones having fracture gradients exceeded by the hydrostatic pressure of the drilling fluid, and so forth. As a result, the service provided by such fluids is more difficult to achieve. In some cases such fluids may enter natural aquifers that may supply drinking or agricultural water.

Accordingly, an ongoing need exists for compositions and methods of preventing the unwanted loss of fluids during wellbore servicing.

SUMMARY

Disclosed herein is a method of servicing a wellbore in contact with a subterranean formation comprising placing a wellbore servicing fluid comprising a polyuronide polymer within the wellbore, contacting the wellbore servicing fluid with a divalent ion source, and allowing the wellbore servicing fluid to form a gel within the wellbore wherein the divalent ion source is located within the wellbore.

Also disclosed herein is a method of servicing a wellbore in contact with a subterranean formation comprising (a) placing a wellbore servicing fluid comprising a polyuronide polymer into the wellbore wherein the wellbore servicing fluid contacts a calcium ion source, (b) shutting the wellbore and allowing the servicing fluid to set into place for a period of time, and (c) repeating steps (a) and (b) until the permeability of a structure within the wellbore is reduced by about 50%.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments, reference will now be made to the accompanying drawings in which.

NOTATION AND NOMENCLATURE

Figure 1:
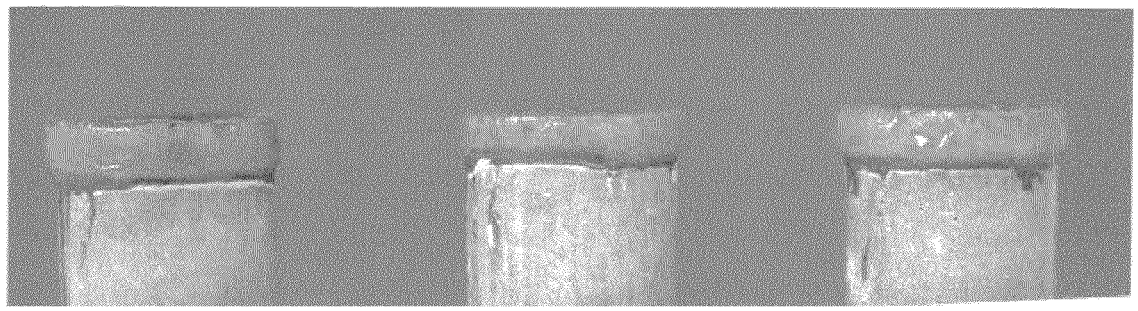
FIG. 1 is a picture of the samples from Example 1.

Certain terms are used throughout the following description and claims to refer to particular system components. As one skilled in the art will appreciate, different companies may refer to a component by different names. This document does not intend to distinguish between components that differ in name but not function.

DETAILED DESCRIPTION

Disclosed herein are wellbore servicing fluid compositions and methods of using same. In an embodiment, the wellbore servicing fluid composition comprises a crosslinkable polymer system comprising a polyuronide. In another embodiment, the wellbore servicing fluid composition consists or consists essentially of a polyuronide. In another embodiment, the wellbore servicing fluid composition comprises a crosslinkable polymer system which consists or consists essentially of a polyuronide. Such fluid compositions and methods of making and using same are described herein in detail.

In an embodiment, the wellbore servicing fluid (WSF) comprises a crosslinkable polymer system comprising a polyuronide. Polyuronides herein refer to a broad class of polysaccahrides which are naturally occurring polymers of uronic acid. Uronic acid is a monomeric hexose in which the C-6 carbon is oxidized to a carboxylic acid group. Nonlimiting examples of polyuronides include alginates, pectinates and tragacanthic acid. Nonlimiting examples of uronic acids include galacturonic acid, glucuronic acid, guluronic acid, and mannuronic acid. In an embodiment, the wellbore servicing fluid composition comprises a polyuronide with a molecular weight (MW) of from about 2000 Daltons to about 1,000,000 Daltons, alternatively from about 200,000 Daltons to about 500,000 Daltons, alternatively from about 60,000 Daltons to about 130,000 Daltons.

In one embodiment the WSF comprises a polyuronide that is a derivative of alginic acid, alternatively an alginate, alternatively an alkali or alkaline earth metal salt of alginic acid. In an embodiment, the polyuronide is an alginate polymer. In an embodiment the alginate polymer comprises an alginate salt. Nonlimiting examples of alginate salts suitable for use in this disclosure include potassium alginate, magnesium alginate, calcium alginate and triethanolammonium alginate. Alternately, the alginate can be used in the acid form, in combination with pH adjusting buffers.

Alginate polymers are typically isolated from kelp or sea weed and contain monomeric units of alpha-L-guluronic acid (G unit) and beta-D mannuronic acid (M unit) and may be organized as: (1) homopolymeric M blocks (polymannuronate an example of which is depicted in Structure 1A); (2) homopolymeric G blocks (polyguluronate an example of which is depicted in Structure 1B); or (3) heteropolymeric G-M blocks with randomly arranged GG and MM block sequences (an example of which is depicted in Structure 1C), alternating GM sequences; or any combination thereof.

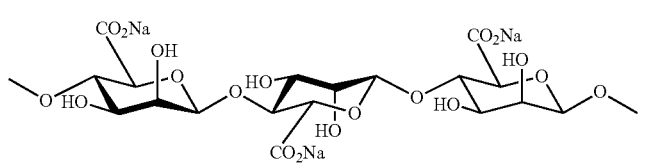

Structure 1A

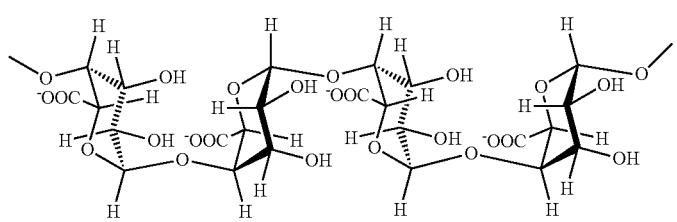

Structure 1B

Structure 1C

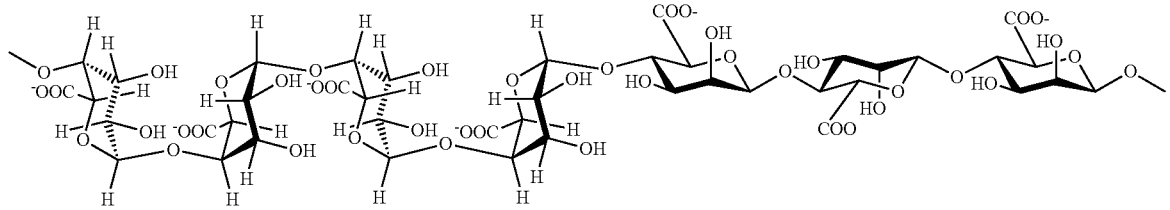

An alginate suitable for use in the present disclosure may comprise heteropolymeric GM blocks and have an M:G ratio of from about 2:8 to about 8:2 alternatively from about 3:7 to about 7:3, alternatively from about 4:6 to about 6:4. In an embodiment, the alginate is a high GG block alginate containing equal to or greater than about 25% GG blocks, alternatively equal to or greater than about 40% GG blocks, alternatively equal to or greater than about 50% GG blocks. Without wishing to be limited by theory, it is believed that GG blocks provide gelling ability to the polymer molecule upon interaction with Group II metal ions, whereas GM blocks and MM-blocks provide flexibility to the molecule.

In an embodiment, the alginate polymer may be altered to meet some user and/or process desired need. For example, the alginate polymer may be altered enzymatically using epimerases. In an embodiment, the alginate polymer is chemically modified by esterification of native carboxylate groups with alcohols such as propylene glycol, ethylene glycol, and methanol. Methods and compositions for esterification of alginate polymers are known to one of ordinary skill in the art with the benefits of this disclosure.

Examples of commercially available alginates suitable for use in this disclosure include without limitation KELCO-LOID LVF, and KELCOLOID HVF which are alginates having a portion of the carboxylate groups esterified with propylene glycol and MANUGEL GHB which is a sodium alginate each of which is available from ISP Polymers Inc. In an embodiment, the WSF comprises an alginate polymer of the type described herein with a molecular weight (MW) of from about 14,000 Daltons to about 1,000,000 Daltons alternatively from about 100,000 Daltons to about 700,000 Daltons, alternatively from about 200,000 Daltons to about 500,000 Daltons.

In an embodiment, the WSF comprises a polyuronide comprising a pectinate polymer. Chemically, pectin is a straight chain of α-D-galacturonic acid molecules linked by 1,4-glycosidic linkages which are all di-equatorial due to the C1 conformation. The structure of D-galacturonic acid is shown below (Structure 2).

Structure 2

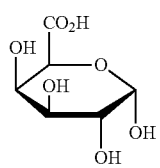

The carboxylate groups in native pectinates are present predominantly as methyl esters with varying degrees of methylation. Pectinate polymers, depending on the degree of methylation may either form clear solutions (high methylation) or turbid suspensions with low viscosity (low methylation). Herein a high degree of methylation refers to from about 50% to about 80% of the C6-COOH present as the methyl ester, while a low degree of methylation refers to methylation of less than about 50% of the carboxylic acid groups present. The remaining non-methylated carboxylic acid groups may be present as free —COOH groups, or as sodium, potassium, calcium or ammonium groups. In an embodiment, a portion of the methyl ester groups may be reacted with ammonia to form an amide group and as a result of this reaction the resulting polymer may contain, amide groups, methyl ester groups and carboxylic acid groups or the salt form of the carboxylic acid groups. In an embodiment, a pectinate suitable for use in this disclosure has a degree of methylation of from about 20% to about 50%, alternatively from about 25% to about 48%, alternatively from about 30% to about 40%. In an embodiment, pectinates suitable for the present disclosure include any combination of C6-amide groups and C6-methyl ester groups, provided that the sum of amide and ester groups are within the above disclosed range.

In an embodiment, the WSF comprises a metal salt of a pectinate polymer. In an embodiment, the WSF comprises an alkali metal salt of a pectinate polymer, alternatively a sodium or potassium salt of a pectinate polymer. In an embodiment, the WSF comprises sodium pectinate. The sodium salts of pectinates may be highly water soluble, partially water soluble, or water dispersible depending on a variety of factors such as the degree of methylation, the type of other solids present and pH.

Examples of commercially available pectinates suitable for use in this disclosure include without limitation GENU X-914 (low methylation) and GENU PECTIN (Citrus) USP/100 (high methylation) each of which is available from CP Kelco Inc. Pectinate polymers are also used in preparation of fruit jams and jellies. A food grade pectin, which also contains citric acid and glucose, is available in stores under the trade name SURE JELL.

In an embodiment, the WSF comprises a pectinate polymer with a MW of from about 30,000 Daltons to about 1,000,000 Daltons, alternatively from about 70,000 Daltons to about 700,000 Daltons, alternatively from about 60,000 Daltons to about 250,000 Daltons.

In an embodiment, the WSF comprises a polyuronide polymer which is present in the WSF in an amount of from about 0.05 wt. % to about 8 wt. %, alternatively from about 0.1 wt. % to about 6 wt. %, alternatively from about 0.2 wt. % to about 3 wt. % by weight of WSF. In an embodiment, the WSF comprises an alginate polymer which is present in the WSF in an amount of from about 0.05 wt. % to about 6 wt. %, alternatively from about 0.1 wt. % to about 4 wt. %, alternatively from about 0.2 wt. % to about 2 wt. % by weight of WSF. In an embodiment, the WSF comprises a pectinate polymer which is present in the WSF in an amount of from about 0.1 wt. % to about 8 wt. %, alternatively from about 0.5 wt. % to about 6 wt. %, alternatively from about 1.0 wt. % to about 4 wt. %.

In an embodiment, a WSF comprising a polyuronide of the type described herein (e.g. alginate, pectinate) forms a gel when contacted with a divalent ion source. As used herein, a gel is defined as a crosslinked polymer network swollen in a liquid medium. The divalent ion may comprise any divalent ion able to crosslink polyuronides of the type disclosed herein to form a gel. In an embodiment, the divalent ion comprises Group II metal ions. Without wishing to be limited by theory, the propensity of polyuronides to form a gel when contacted with a Group II metal ion may be ordered as follows: $Mg^{2+} \ll Ca^{2+} \sim Ba^{2+} \sim Sr^{2+}$.

In an embodiment, the WSF comprising a polyuronide contacts a divalent ion source when placed in the wellbore. Further, it is contemplated that prior to introduction to the wellbore, the WSF is not contacted with a divalent ion source and/or a divalent ion. In an embodiment, the divalent ion source is a source of divalent Group II metal ions. Hereinafter for simplicity the disclosure will refer to the Group II metal ions and as will be understood by one of ordinary skill in the art the Group II metal ions are in a divalent oxidation state. Nonlimiting examples of Group II metal ions in situ sources include carbonate rock, shale rock and fractured or debonded cement surfaces. For example, the Group II metal ion source may be the face of the subterranean formation or a cement sheath disposed within the formation. As such the gels form in-situ after placement of the WSF comprising a polyuronide into the subterranean formation.

In an embodiment the Group II metal ions are present proximate to the surface of the source (e.g. formation or wellbore) or may readily partition or diffuse into the WSF upon contact. In cases where the formation or well bore surfaces do not contain sufficient quantities of Group II metal ions to form gels with polyuronides, Group II metal ions may be provided in a treatment fluid prior to introduction of the WSF comprising a polyuronide into the wellbore or the formation. In such an embodiment, the treatment fluid may be introduced to the wellbore or formation such that the formation or wellbore surfaces may be coated or made to contain the Group II metal ion in the outside layers of the surface, for example as part of a filtercake. Such treatment fluids may be solutions of soluble Group II metal ion salts, or suspensions of Group II metal ion water-insoluble salts such as calcium carbonate, or sparingly soluble salts such as calcium sulfate-hydrate or barium sulfate.

In an embodiment, the Group II metal ion comprises calcium. In other embodiments, the Group II metal ion comprises barium. Hereinafter the disclosure will discuss the use of calcium ions as the Group II metal ion; however other Group II metal ions as discussed previously herein are also contemplated.

In an embodiment, the WSF comprising a polyuronide is contacted with calcium ions that may be present naturally in the subterranean formation that contains the wellbore. Examples of subterranean formations containing calcium ions include calcium carbonate formations such as dolomite and calcite, shale rock and cementicious material that binds sand grains in a sandstone formation. In a completed wellbore that has been cased and cemented, the source of the calcium ion may be the cement column behind the casing comprising Portland cement, calcium aluminate cement, calcium oxide cement, Class C flyash cements and/or cement kiln dust containing cements. In an embodiment, the WSF comprising polyuronides is contacted with calcium ions that are introduced to the wellbore or formation. Calcium ions may be introduced into the formation as a pretreatment fluid such as a soluble calcium salt solution or a calcium chloride solution. The pretreatment fluid may contact the surfaces of the formation and allow for the deposition of calcium onto the surfaces prior to contacting the treated surfaces with a WSF comprising polyuronide of the type described herein. Without wishing to be limited by theory, is believed that the Group II metal ions (e.g., calcium) from the source (e.g., cement sheath) diffuse to the binding sites in polyuronides and form gels at rates defined by a variety of factors such as diffusion rates, solubility and temperature. In an embodiment, a method of servicing a wellbore comprises contacting a WSF comprising a polyuronide of the type described herein and a Group II metal ion (e.g., calcium) and subsequently employing a shut-in time of appropriate duration.

Without wishing to be limited by theory, the calcium ions may function to crosslink the carboxylate groups of the polyuronide by forming what are known as "egg-crate" structures as shown below.

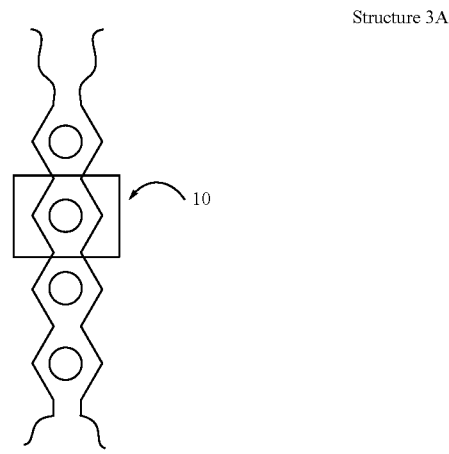

Structure 3A

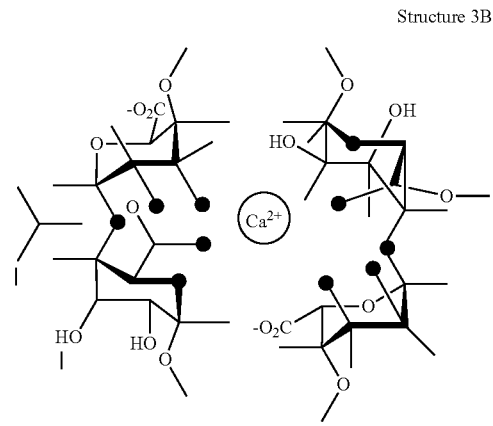

Structure 3B

Structure 3A is a representation of the egg-crate structure formed by contacting calcium with an alginate to form calcium alginate. In structure 3A the circles represent $Ca^{2+}$ ions; Structure 3B is an expanded view of a portion 10 of the calcium alginate structure depicted in Structure 3A.

The gels formed when a WSF fluid comprising a polyuronide is contacted with a Group II metal ion (both of the type described herein) range from rigid to elastic gels. Herein a rigid gel qualitatively refers to gels with dimensional stability that is the gel strength will support the retention of the shape and is non-flowable, while an elastic gel qualitatively refers to a gel that is elastically deformable and may be flowable. It is to be understood that the gels formed according to the compositions and methods disclosed herein may initially be flowable, and elastic and in some instances will transition to form rigid and non-flowable gels. Such a transition may be the result of continued contact of the polyuronide with the Group II metal ion resulting in the continued incorporation of the Group II metal ion into the gel structure. As will be understood by one of ordinary skill in the art the type of gel formed will depend on a variety of factors such as the nature (e.g., molecular composition such as G/M ratio, block structure, degree of methylation and the like) and amount of polymeric materials and metal ions, reaction temperature, pH, ionic strength and strength of the gel structure. Further, the strength of the gel formed will depend on a variety of factors such as the concentration of the reactants, ionic strength, and pH of the solution.

The gels formed according to this disclosure are examples of ionic gels, also referred to as ionotropic gels. Ionotropic gels are formed when polyelectrolytes, for example an anionic polymer such as alginate or pectinates, are contacted with polyvalent metal ion of opposite charge. These gels are physical gels, which is to say that the three dimensional gel network is formed by ionic associations between opposite charges and not due to covalent bonds.

In an embodiment, the WSF comprises an alginate of the type described herein. Upon contact with a Group II metal ion source, of the type described herein, the WSF forms a gel with the Group II metal ions that are available from the ion source (e.g., surface metal ions) as described previously herein. In such an embodiment, the gel time may be adjusted to meet some user and/or process-desired need by chemical modification of the alginate polymer, such as by esterification. Gel time herein refers to the period of time from initial contact of the components to the point when a gel is formed. Esterification of the alginate polymers to extend gel times has been previously described herein.

In an embodiment, the degree of esterification of the alginate polymers is adjusted so as to change the kinetics of the interaction between the alginates and the Group II metal ion. For example, increasing the degree of esterification of the alginate may increase the gel time when the WSF contacts a Group II metal ion. In an alternative embodiment, the degree of esterification of the alginates may be decreased so as to decrease the gel time of the WSF comprising alginates. The degree of esterification of the alginate may be adjusted prior to inclusion of the alginate in the WSF using the methodologies previously disclosed herein.

In an alternative embodiment, the WSF may contain one or more in-situ acid generating materials. Such in-situ acid-generating materials may accelerate the rate of gelation of the WSF comprising alginates by hydrolysis of the ester groups present on the alginate. Hydrolysis of the ester groups would liberate free acid groups which in turn could further reduce the esterification of the alginate. Alternatively or in addition to hydrolysis of the alginate ester groups, in situ acid-generating materials may increase the availability of the divalent ions by aiding in dissolution of the formation or wellbore materials, thereby facilitating the release of the Group II metal ions. Nonlimiting examples of in-situ acid generating materials suitable for use in this disclosure include gluconolactone, citric acid, and polylactic acid. In an embodiment, the in situ acid generating material is present in the WSF in an amount of from about 0.1 wt. % to about 10 wt. %, alternatively from about 0.5 wt. % to about 8 wt. %, alternatively from about 1 wt. % to about 5 wt. % by weight of the polyuronide.

In an embodiment, a WSF comprising a pectinate, when contacted with a Group II metal ion source (both of the type described herein), forms a gel as described previously herein. As will be understood by one of ordinary skill in the art, depending on a variety of factors, pectinates may form turbid solutions. However, the turbidity of the pectinate in the WSF does not affect gelation of these solutions or suspensions in the presence of Group II metal ions of the type described herein.

In some embodiments, pectinates in the WSF comprise carboxylate groups which are present predominantly as methyl esters. The degree of methylation of the pectinate may be a determinant in the reactivity of the pectinate with the Group II metal ions and the rate of gel formation. Alternatively or in addition to, pectinates in the WSF may comprise an amidated pectinate. Herein an amidated pectinate refers to a pectinate that has at least a portion of the carboxylate groups converted to amide groups by reaction with ammonia. In an embodiment, the degree of methylation of the pectinate may be varied so as to adjust the gelation time when the WSF comprising a pectinate is contacted with one or more Group II metal ions. The gel time may be adjusted so as to meet some user and/or process-desired need. In an embodiment, the WSF comprises a low methylation pectin and/or an amidated low methylation pectin. Without wishing to be limited by theory, such low methylation and/or amidated low methylation pectins may provide increased flexibility in the adjustment of gel time when compared to high methylation and amidated high methylation pectins.

In an embodiment, the WSF may further comprise one or more additives or modifying agents as deemed necessary to impart the desired physical properties. Such additives may include but are in no way limited to fluid absorbing materials, resins, aqueous superabsorbers, viscosifying agents, suspending agents, dispersing agents, salts, accelerants, surfactants, retardants, defoamers, settling prevention agents, weighting materials, dispersants, vitrified shale, formation conditioning agents, or combinations thereof. These additives may be included singularly or in combination. Methods for introducing these additives and their effective amounts, as well as methods of incorporating these additives into the WSF are known to those of ordinary skill in the art.

In an embodiment, the WSF may contain one or more sequestering agents. Such sequestering agents, also termed chelating agents, may function to preferentially contact and sequester or chelate ions that may impede or detrimentally impact the interaction of a Group II metal ion with a polyuronide. For example, the sequestering agent may preferentially sequester iron (e.g., $Fe^{2+}$) or lead (e.g., $Pb^{2+}$) present in the formation. Sequestering agents suitable for use in this disclosure are known to one of ordinary skill in the art with the aid of this disclosure. Nonlimiting examples of such sequestering agents include ethylenediaminetetracetic acid, diethylenetriaminepentaacetic acid, N,N-bis(carboxymethyl)glycine, citric acid, and acetic acid.

In some embodiments, the WSF comprising polyuronide polymers comprises crosslinking agents. Any crosslinking agent able to aid in the formation of a gel having properties as described herein and compatible with the other components of the composition may be employed.

The gel time of a WSF comprising polyuronide polymers in the presence of Group II metal ions of the type described herein will depend on a number of factors such as the composition and concentration of the polymer, the composition, concentration and diffusion rates from the sources of the Group II metal ions, and the Group II metal ion source. In an embodiment, the gel time of a WSF comprising polyuronides when contacted with a Group II metal ion source at room temperature ranges from about 5 hrs to about 76 hrs, alternatively from about 10 hrs to about 48 hrs, alternatively from about 18 hrs to about 30 hrs. It should be understood that gel time in the formation of ionic or ionotropic gels depends on the measurement method of gel strength, because the polymer solution will keep forming the gel from the surface of the metal ion source outward as long as either the ungelled polymer solution is available and/or the divalent metal ions are available. In wellbore treatment or formation injection applications, the available space filled with the polymer solution will gradually and ultimately be filled with gelled polymer by gel formation extending from the interface of polymer solution and metal source outward. To aid in competent gel formation to accomplish desired goal, a shut-in time of appropriate duration after pumping the WSF comprising polyuronides is contemplated.

The gels formed when a WSF comprising a polyuronide is contacted with a Group II metal ion source (both of the type described herein) may be thermally stable. Herein a thermally stable gel refers to a gel that resists water expulsion accompanied by gel volume reduction, or disintegration of the gel to a thin solution of viscosity less than that of a gel at elevated temperatures. For example, the gel formed when a WSF comprising a polyronide is contacted with a Group II metal ion source may be stable at a temperature ranging from about 50° F. to about 300° F.; alternatively at a temperature ranging from about 75° F. to about 200° F.; alternatively at a temperature ranging from about 100° F. to about 180° F. for periods equal to or greater than about 1 week.

As used herein, a "servicing fluid" refers to a fluid used to drill, complete, work over, fracture, repair, or in any way prepare a wellbore for the recovery of materials residing in a subterranean formation penetrated by the wellbore. Examples of servicing fluids include, but are not limited to, drilling fluids or muds, spacer fluids, fracturing fluids, completion fluids, remedial fluids, and treatment pills all of which are well known in the art. It is to be understood that the WSF should not contain components which interfere with gelation of polyuronide or prematurely gel polyuronide prior to its intended use. The servicing fluid is for use in a wellbore that penetrates a subterranean formation. It is to be understood that "subterranean formation" encompasses both areas below exposed earth and areas below earth covered by water such as ocean or fresh water. Hereinafter, a WSF may comprise any of the polyuronides disclosed previously herein and which are collectively referred to hereinafter as Group II metal ion crosslinkable polymer systems (G2-CPS). In some embodiments, the G2-CPS excludes a gel modifier wherein the gel modifier comprises borates, polyvinyl alcohols, polycarboxylic acids, polyacrylamides, or mixtures thereof. Alternatively, the G2-CPS excludes a gel modifier wherein the gel modifier is selected from the group consisting of borates, polyvinyl alcohols, polycarboxylic acids, polyacrylamides, and mixtures thereof.

In an embodiment, the WSF comprises a drilling fluid. That is the G2-CPS is combined with one or more components of a drilling fluid. The resulting composition (i.e., drilling fluid+G2-CPS) may function to reduce fluid loss to the formation permeability. Drilling fluids are generally viscous, heavy fluids designed to perform a variety of functions during well drilling, including (1) preventing formation fluids from entering into the wellbore and causing a blow out by exerting sufficient pressure against the formations being drilled; (2) keeping the drilling bit cool and clean during drilling; (3) bringing out the cuttings generated by the bit; (4) keeping the cuttings in suspension; and (5) minimizing reservoir damage and limiting corrosion. Drilling fluids may be water-based or oil-based. In an embodiment, the WSF comprises any drilling fluid compatible with the needs of the process. For example, drilling fluids that substantially alter the gel time of the polyuronide may be avoided. In an embodiment, a conventional drilling fluid containing insoluble calcium salts as bridging particles to improve the fluid loss characteristics of filter cake deposited on the well bore walls, is used to drill the well. A second treatment fluid comprising a G2-CPS and an additive (e.g., an acid) that will dissolve small amounts the insoluble calcium salt is circulated in the wellbore. Alternatively, the second treatment fluid comprises a G2-CPS is in an acid form. In such embodiments, the additive or acid form of the G2-CPS may function to dissolve the insoluble calcium salt thus providing Group II metal ions (e.g., calcium) to the filtercake formed on the surface of the wellbore. Consequently, the G2-CPS when contacted with the Group II metal ion forms a gel that extends outward from the surface of the filtercake thereby improving the fluid loss control property of the filtercake. Similarly, a sequence of treatments may be designed and used to control loss circulation of drilling fluids into thief zones or fractures. In an embodiment, a method of improving the fluid loss control property of a filtercake comprises placing in the wellbore a drilling fluid comprising a graded calcium carbonate of suitable particle size. The method further comprises introducing a material which can dissolve the graded calcium carbonate, such as for example citric acid to form solublized calcium carbonate. The method may further comprise contacting the surfaces containing the solubilized calcium carbonate with a G2-CPS of the type described herein.

In an alternative embodiment, a method of improving the fluid loss control property of a filtercake comprises placing in the wellbore a drilling fluid comprising barite (barium sulfate), which is sparingly soluble in water. The method may further comprise introducing a G2-CPS of the type described herein thereby contacting the G2-CPS with one or more surfaces of the wellbore that have been pretreated with barite. Barite may provide effective amounts of barium ions for gelling the polyuronide solution.

In an embodiment, the WSF comprising a G2-CPS is substantially solids-free. Herein substantially solids free refers to the composition having less than about 10% particles by volume of WSF comprising a G2-CPS where the particle size is greater than about 5 micron.

In an embodiment, the WSF comprising a G2-CPS is a conformance control fluid. Herein conformance control refers to any action taken to improve the water to oil ratio; that is to decrease the amount of water while increasing or without significantly decreasing the amount of oil in the produced fluids. This is conventionally accomplished in watered out zones by pumping gelling fluids with optimized gel times in zones which are well separated from oil producing zones. An advantage of the methods and compositions of the current disclosure is that prior optimization of gel times is not necessary because the gelling agent is provided by the formation. In zones which are devoid of significant amounts of Group II metal ion containing minerals, the Group II metal ion (e.g., as a calcium salt solution) may be injected into the formation as the first treatment fluid, followed by a polyuronide solution. In some embodiments, the two treatment fluids are separated by an aqueous spacer fluid.

In an embodiment, a WSF comprising a G2-CPS of the type described herein is contacted with a Group II metal ion during an enhanced oil recovery operation (EOR). For example, to sweep bypassed zones, fluids such as viscosified polymer solutions or surfactant solutions may be pumped into a formation via an injector well. However, such fluids may bypass oil zones by flowing through high permeability channels that connect an injector well to a producer well. In order to increase the sweeping efficiency of an EOR fluid, WSF comprising a G2-CPS may be pumped into the injector well first, where it contacts a Group II metal ion source and is allowed to form gels in the high permeability channels thereby sealing such flow paths. A subsequent injection of an EOR fluid system would then sweep bypassed oil zones more effectively.

In an embodiment, the WSF comprising a G2-CPS is a loss circulation fluid composition. The WSF comprising a G2-CPS when placed in a loss circulation zone that contains a Group II metal ion source of the type previously described herein produces a permanent plug that is rigid, adhesive and of appreciable compressive strength.

In embodiments, the WSF comprising a G2-CPS may be introduced to the wellbore to prevent the loss of aqueous or non-aqueous drilling fluids into loss circulation zones such as voids, vugular zones, and natural or induced fractures while drilling. In an embodiment, the WSF comprising a G2-CPS is placed into a wellbore as a single stream and activated by Group II metal ions (such as calcium ions) contained in a Group II metal ion source to form a barrier that substantially seals lost circulation zones. In such an embodiment, the fluid may be placed downhole through the drill bit forming a composition that substantially eliminates the lost circulation. In an embodiment, the gel plug formation may be enhanced by placing insoluble salts of Group II metal ions of suitable size into the lost circulation zone, followed by contacting such solids with G2-CPS (e.g., polyuronide solution) containing suitable amounts of materials that partially dissolve the insoluble Group II metal ion salt and provides an amount of the Group II metal ion effective to form gels when contacted with the G2-CPS.

In some embodiments, the WSF comprising a G2-CPS may form a non-flowing, intact mass inside the lost circulation zone which plugs the zone and inhibits loss of subsequently pumped drilling fluid, which allows for further drilling. In an embodiment, the well is shut-in for a suitable duration to complete the plugging phenomenon as may be evident by circulation of the desired fluid without loss to the formation, or by increased injection pressures.

Many producing and abandoned oil wells develop cracks or flow pathways due to a variety of factors such as imposed stresses from cyclic pressure, temperature changes during the production phase of the well, and/or debonding of cement column from either the formation and/or the casing. The flow paths in the latter case are generally referred to as microannuli. In some embodiments, the WSF comprising a G2-CPS is used as a sealing squeeze fluid that is effective in sealing off micro-annuli and preventing the flow of unwanted fluids through the well.

For example, the WSF comprising a G2-CPS may be introduced to a wellbore that has developed one or more microannuli. Introduction of the WSF comprising a G2-CPS may involve forcibly injecting under pressure (squeezing) the material into one or more microannuli accessible to the user. Introduction of the WSF comprising a G2-CPS is typically followed by a shut-in period wherein the fluid is allowed to form a gel. Subsequent forcible injections of the WSF comprising a G2-CPS and shut-in periods may be carried out until the squeeze pressures reach values that are sufficiently high so as to insure blockage of the microannuli. In some embodiments, the WSF comprising a G2-CPS is introduced to an abandoned or leaking well in order to mitigate pressure behind the casing or at a wellhead.

In an embodiment, the WSF comprising a G2-CPS is used for sealing off holes in a casing that has been cemented, or to seal perforations through cement in a zone that is depleted so that another oil bearing zone can be stimulated by perforation and fracturing. The procedure for accomplishing such sealing action is similar to the squeezing procedure described above. Various procedures that may be followed to use a sealant composition in a wellbore are described in U.S. Pat. Nos. 5,346,012 and 5,588,488, which are incorporated by reference herein in their entirety.

In an embodiment, a WSF comprising a G2-CPS is used for treating wellbores completed in subterranean formations containing Group II metal ions, such as calcium based minerals, for example, calcium carbonate formations, dolomite formations and shale zones. In some embodiments, the WSF comprising a G2-CPS comprises alginate polymers. In some embodiments, the WSF comprising a G2-CPS comprises pectinate polymers.

When a WSF comprising a G2-CPS is injected downhole in subterranean formations, Group II metal ions (such as calcium ions) that are components on the mineral surface of the formations, when coming in contact with the fluid, cause the fluid to form a gel. In some embodiments, the Group II metal ions on the surface of the formation are depleted by reaction with WSF comprising a G2-CPS. It is contemplated that in such embodiments, additional gel formation may occur when Group II metal ions contained in the formation diffuse to the surface and react with the fluid.

In an embodiment, subterranean well bore surfaces are the sources of the Group II metal ion (or contain one or more Group II metal ion as a structural component of the formation). In an embodiment, the cement column behind a casing is the source of Group II metal ion. In an embodiment, the well bore surface is pretreated with a Group II metal ion source prior to contact with the WSF comprising a G2-CPS. In an embodiment, one or more Group II metal ion containing particulate solids is incorporated into an aqueous wellbore treatment fluid as a bridging agent to control fluid loss characteristics of a filter cake. In an embodiment, the Group II metal ion is pre-reacted with the WSF comprising a G2-CPS (or the G2-CPS is cross-linked with a Group II metal) and the resulting material is used in a dehydrated, particulate form in a non-swelling treatment fluid, and allowed swell in the wellbore by contacting with a swelling fluid. In an embodiment, the Group II metal is calcium. In an embodiment, the well bore treatment fluid is injected into the permeability of the subterranean formation and allowed to contact with Group II metal ion source in the porosity of the subterranean formation.

In some embodiments, the WSF comprising a G2-CPS is a drilling fluid, a conformance control fluid, an EOR fluid, a lost circulation fluid or combinations thereof. In some embodiments, the WSF comprising a G2-CPS is a squeeze fluid for cemented zones.

In an embodiment, the WSF comprising a G2-CPS may reduce the permeability of a formation to which it is introduced by greater than about 50%, alternatively greater than about 75%, alternatively greater than about 99%.

EXAMPLES

The invention having been generally described, the following examples are given as particular embodiments of the invention and to demonstrate the practice and advantages thereof. It is understood that the examples are given by way of illustration and are not intended to limit the specification of the claims in any manner.

Example 1

The ability of a WSF comprising a G2-CPS to form a gel when contacted with a multivalent metal ion source was investigated. Three alginate polymers were tested by exposing a 0.5% solution of these polymers to a set Portland cement cylinder in a beaker. Samples A, B, and C comprised KELCOLOID LVF; MANUGEL GHB; and a sodium alginate solution, respectively. KELCOLOID LVF, is an algin polymer commercially available from FMC Biopolymer that has been chemically modified by partial esterification of native carboxylate groups with propylene glycol to delay interaction with calcium ions and has a viscosity of <50 cP. MANUGEL GHB is a low molecular weight sodium alginate with a viscosity of <25 cP commercially available from ISP Performance Chemicals. The sodium alginate solution is a high molecular weight polymer commercially available from Aldrich Chemical Company.

At room temperature, a gel began to form next to the cement skin that extended outward into the solution when the system was allowed to stand quiescently.

The glass containers containing the cement cylinders and polymer solutions were kept in a water bath maintained at 150° F. for more than a week. The formed gels remained intact—i.e., the gels did not break down and the viscosity did not decrease substantially. A picture of the cylinders with formed gels is shown in FIG. 1. The cylinders were held upside down to more clearly depict the gel formed.

Example 2

Figure 2:
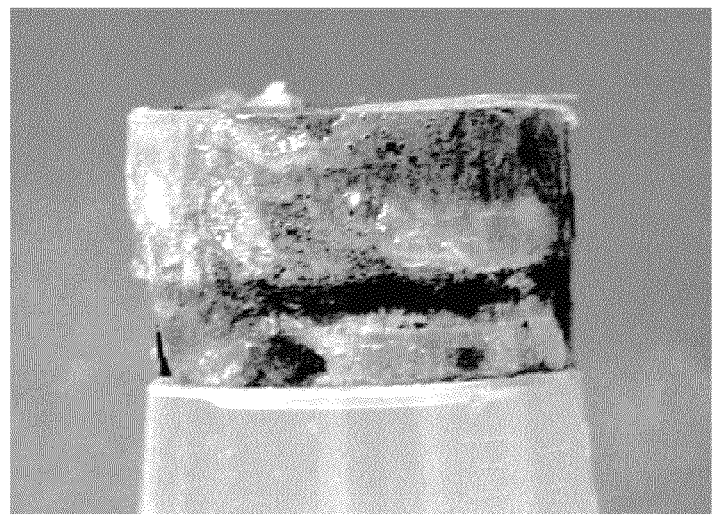
FIG. 2 is a picture of the samples from Example 2.

The ability to form a gel by contacting a pectinate and a divalent metal ion source was investigated. A food grade pectin available in stores under the trade name SURE JELL® was dissolved in deionized water to make 1% and 5% solutions. A set Portland cement cylinder (2" in diameter) was placed in each solution and allowed to stand in a bottle for a day at room temperature. The sample in 1% solution had a thin gel layer formed on the immersed portion of the cylinder and there were gel chunks in the water. The 5% solution formed a fairly stiff gel on the cylinder surface (FIG. 2). The proprietary powder of SURE JELL® lists citric acid, dextrose and fruit pectin as its ingredients. The results demonstrate the ability of a pectin polymer to form a gel upon contact with a multivalent metal ion source (i.e., Portland cement cylinder).

Example 3

The ability to form a gel by contacting a polyuronide and a carbonate source was investigated. Carbonate cores (Bedford carbonate) were allowed to stand at room temperature in 1% solutions of three alginate polymers—partially esterified alginate (KELCOLOID LVF), a non-esterified sodium alginate (MANUGEL GHB), and sodium alginate from Aldrich Chemical Company. Gels started to form on the immersed portions of the carbonate cores within a few hours. Over a longer period of time, the gel grew in mass. For KELCOLOID LVF, the entire solution became a gel; whereas in the other two cases, only the core-exposed fluid formed a gel.

Figure 3:
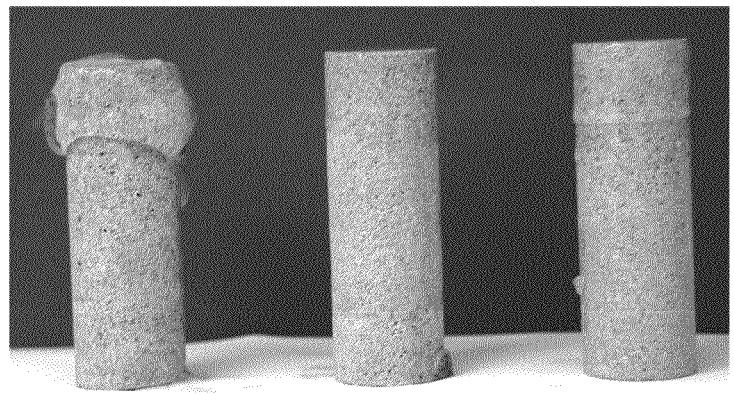
FIG. 3 is a picture of the gel build up on carbonate cores from Example 3.

The carbonate cores with gelled ends are shown in FIG. 3: left core—KELCOLOID LVF, middle core—MANUGEL GHB, and the right core—Aldrich sodium alginate.

Example 4

Figure 4:
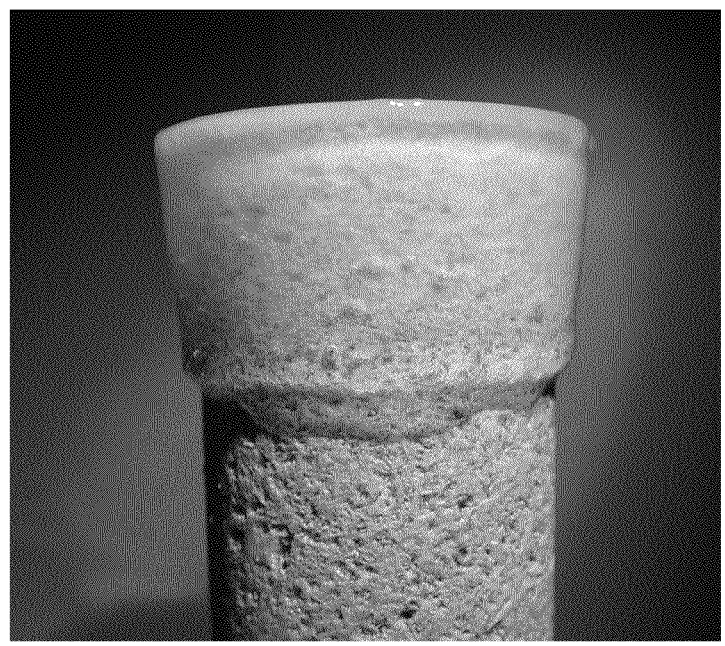
FIG. 4 is a picture of a gel build up on carbonate core from Example 4.

Formation of a gel using carbonate core (Bedford carbonate) and another commercially available pectinate polymer solution was investigated. The experiment was carried out as described in Example 3 using GENU X-914 which is a pectin polymer commercially available from ISP Polymers Inc. The core with a gelled end is shown in FIG. 4.

Pectinate solutions, depending on the degree of methylation may either form clear solutions (high demethylation) or turbid suspensions with low viscosity (low demethylated). The degree of turbidity does not affect gelation around the core, suggesting that such suspensions are suitable for treating fractures.

The results from Example 3 and Example 4 clearly show that stiff gels are formed from alginate and pectinate solution via reactions with calcium ions extracted (or dissolved) from the carbonate cores. Furthermore, the pectinate and alginate solutions have low viscosity and thus are suitable for matrix injection without using excessive injection pressures and to block micro-fractures typically present in low permeability carbonate rocks. Similar results were observed when a 0.5% KELCOLOID LVF solution was reacted with the carbonate cores.

Example 5

Figure 5:
FIG. 5 is a picture of gel build up on shale cores from Example 5.

Formation of a gel using shale cores and polyuronides of the type described herein was investigated. Three shale cores, designated Samples 1-3, were exposed to polyuronide solutions as described in Example 3. Sample 1 was exposed to KELCOLOID LVF; Sample 2 was exposed to MANUGEL GHB; and Sample 3 was exposed to Aldrich sodium alginate. A picture of the shale cores exposed to the various solutions is shown in FIG. 5. The results demonstrate that even non-swelling shales (such as the ones used in this example) form gels by slowly dissolving calcium ions.

With esterified alginate solutions, (e.g., Sample 1) gel formation in 2% KCl solutions may be accelerated by using an in-situ acid generating material such as gluconolactone. Without wishing to be limited by theory, gluconolactone may function to hydrolyze the ester groups and liberate free acid groups that will form gels with any calcium ions present. Gel formation was achieved when a carbonate core was immersed in a 2% KCl solution of KELCOLOID LVF (1%) containing a small amount of gluconolactone.

A reduced amount of gel formation was observed when shale cores were contacted with pectinate solutions. The reduced gel formation was particularly evident when the contact occurred in the presence of a 2% KCl solution.

Example 6

Figure 6:
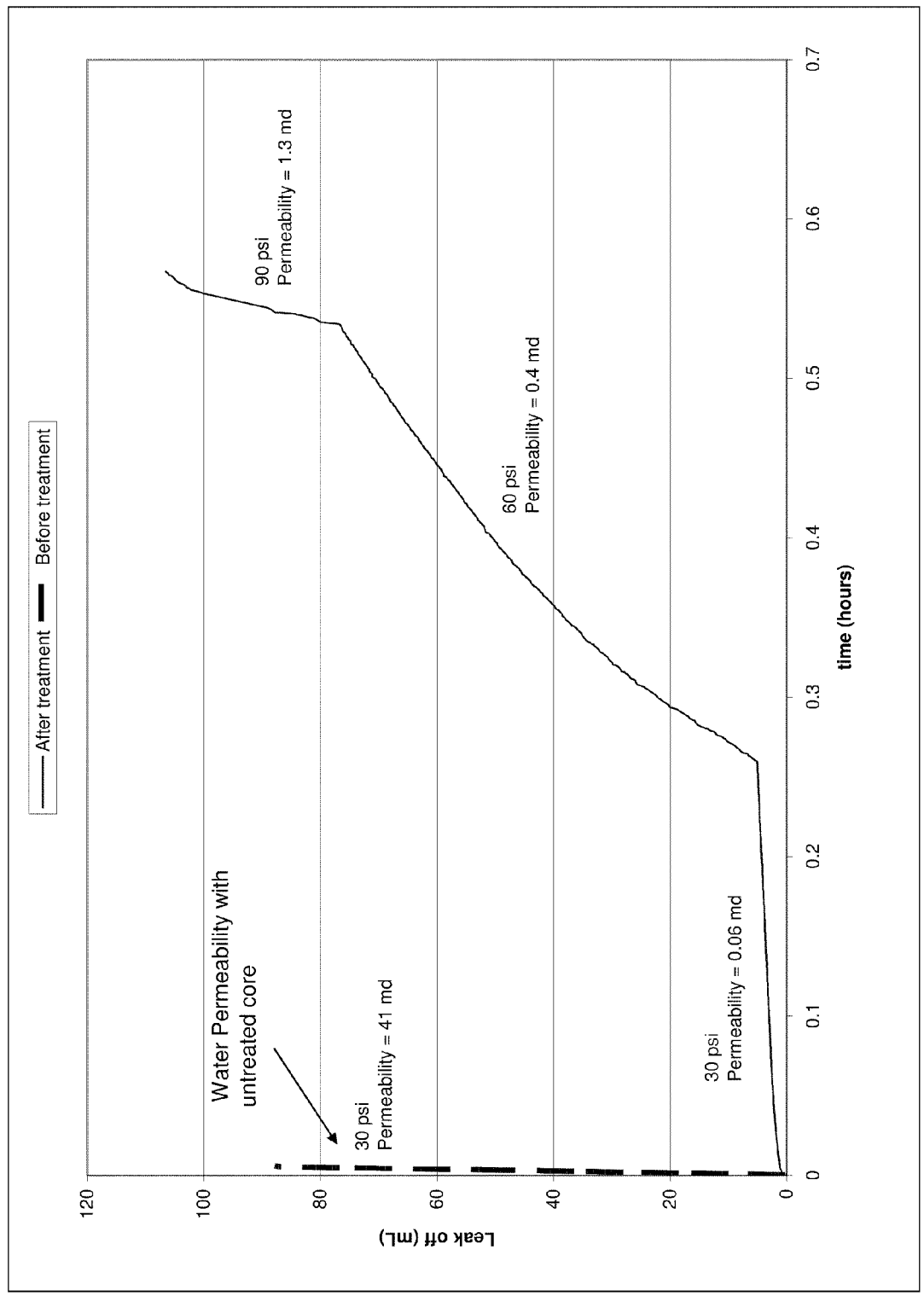
FIG. 6 is the water leak off graph for samples from Example 6.

The ability of gels of the type described herein to reduce formation permeability or to improve fluid loss controlling ability of a filter cake was investigated. For this experiment a test cell was used which had a metal disk with drilled holes, covered by a 325 mesh screen. A WHATMAN® #41 filter paper was placed on top of the mesh screen. Then 25 g of calcium carbonate (average particle size of 25 microns), representing a divalent metal ion source or a bridging particle in a well treatment fluid, for example a drilling fluid, which was slurried in about 100 mL of water was added. FIG. 6 shows the leak off curve for water at 30 psi. Using the approximate dimensions of the set up and the leak off rate shown at 30 psi, permeability was calculated to be 41 mD.

Then 35 mL of a 1.6% KELCOLOID solution was added and the system was allowed to sit overnight. The cell was tipped up the next morning and about 10 mL of fluid poured out; the rest of the fluid was gelled and remained in the cell. Then 30 psi pressure was applied to the test cell and fluid came out immediately but at a much slower rate than the previous case (water only). The pressure was increased twice, and the leak-off rates measured. The calculated permeability is listed in the leak off graph as well (FIG. 6). At each pressure (30 psi, 60 psi, and 90 psi), the calculated permeability is much less than the water-only case, suggesting that the addition of a polyuronide polymer solution of the type described herein reduces water production in carbonate rocks.

Example 7

Figure 7:
FIG. 7 is the gel build up on a cement sample used in Example 7

The ability of a polyuronide solution to reduce the permeability of a cracked cement column was investigated. A cylindrical cement sample was cracked to simulate a cement column that has developed flow path channels in the interior of the cement column. An axially cracked cement core (1'×2" approx) was used for flow studies in a Hassler Flow loop apparatus. The cracked core was held together by a sticky tape along the length prior to insertion into the core holder. Water flow through the core was 12 ml/minute at a confining pressure of 150 psi and flow pressure of 100 psi at room temperature. The core was treated with a 1% KELCOLOID LVF (a modified alginate polymer) solution in deionized water. Because of the viscosity of polymer solution, the confining pressure had to be reduced to 40 psi and inlet flow pressure increased to 200 psi to achieve a treatment flow rate of 1.42 ml per minute. The core was shut-in at room temperature for 36 hrs. The apparatus was dismantled and any gel formed on core surface was cleaned and the flow lines were filled with water. The confining pressure was set to 150 psi and the water flow pressure was adjusted to 100 psi. These values are same as those applied during water flow rate measurement. The flow rate with the gel-plugged core was none. The temperature was increased to 150° F. and flow rate was measured to be zero. The temperature was increased to 180° F., and the flow rate at this temperature was also zero. In order to measure flow through the or around the core, the water inlet pressure was increased gradually to 350 psi while holding the confining pressure at 150 psi and the temperature at 180° F. There was a slight flow (0.05 ml/min) when the inlet pressure increased to 350 psi which is significantly less than 12 ml/min measured at room temperature of untreated core. Another core from the cement sample was placed in the same polymer solution at the time core flow experiment started. It developed a strong gel on the exposed portion. The picture is shown in FIG. 7. The results show that fluid paths inside a cement column can be sealed effectively by squeezing a polyuronide solution into the cement column.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Whenever a numerical range with a lower limit and an upper limit is disclosed, any number and any included range falling within the range is specifically disclosed. In particular, every range of values (of the form, "about a to about b," or, equivalently, "from approximately a to b," or, equivalently, "from approximately a-b") disclosed herein is to be understood to set forth every number and range encompassed within the broader range of values. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc. Also, the terms in the claims have their plain, ordinary meaning unless otherwise explicitly and clearly defined by the patentee.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method of servicing a wellbore in contact with a subterranean formation comprising:
   placing a wellbore servicing fluid comprising a polyuronide polymer within the wellbore, wherein the polyuronide polymer comprises a pectinate polymer or a combination of a pectinate polymer and an alginate polymer and wherein the pectinate polymer has a degree of methylation of from about 20% to about 50%;
   contacting the wellbore servicing fluid with a divalent ion source; and
   allowing the wellbore servicing fluid to form a gel within the wellbore;
   wherein the divalent ion source is located within the wellbore.

2. The method of claim 1 wherein the polyuronide polymer is present in an amount of from about 0.05 wt. % to about 8.0 wt. % by weight of the wellbore servicing fluid.

3. The method of claim 1 wherein the alginate polymer has an M:G ratio of from about 2:8 to about 8:2.

4. The method of claim 1 wherein the alginate polymer has equal to or greater than about 25% GG blocks.

5. The method of claim 1 wherein the polyuronide polymer has a molecular weight of from about 2,000 Daltons to about 1,000,000 Daltons.

6. The method of claim 1 wherein the pectinate polymer is a sodium salt or a potassium salt.

7. The method of claim 1 wherein the divalent ion source comprises metal ions.

8. The method of claim 7 wherein the metal ions comprise alkaline earth metal ions.

9. The method of claim 7 wherein the divalent ion source comprises calcium ions.

10. The method of claim 1 wherein the wellbore servicing fluid is a drilling fluid composition.

11. The method of claim 1 wherein the wellbore servicing fluid is a conformance control fluid.

12. The method of claim 1 wherein the wellbore servicing fluid is an enhanced oil recovery fluid.

13. The method of claim 1 wherein the wellbore servicing fluid is a loss circulation fluid.

14. The method of claim 1 wherein the wellbore servicing fluid is a sealing squeeze fluid.

15. The method of claim 1 wherein the gel is thermally stable at a temperature ranging from about 50° F. to about 300° F.

16. The method of claim 1 wherein the divalent ion source comprises barium ions.

17. The method of claim 1 wherein the wellbore servicing fluid is substantially solids free.

18. The method of claim 1 wherein the divalent ion source consists essentially of carbonate rocks; shale rocks; fractured or debonded cement surfaces; calcium carbonate formations; a cement column comprising Portland cement, calcium aluminate cement, calcium oxide cement, class C flyash cements, cement kiln dust cements, or combinations thereof; or combinations thereof.

19. The method of claim 1 wherein the alginate polymer has a molecular weight of from about 14,000 Daltons to about 1,000,000 Daltons, wherein the pectinate polymer has a molecular weight of from about 30,000 Daltons to about 1,000,000 Daltons.

20. The method of claim 1 wherein the wellbore servicing fluid further comprises an in-situ acid generating material.

21. A method of servicing a wellbore in contact with a subterranean formation comprising:

(a) placing a treatment fluid comprising a calcium ion source into the wellbore;
(b) placing a wellbore servicing fluid comprising a polyuronide polymer into the wellbore wherein the wellbore servicing fluid contacts the calcium ion source, wherein the polyuronide polymer comprises a pectinate polymer or a combination of a pectinate polymer and an alginate polymer and wherein the alginate polymer is chemically modified by esterification;
(c) shutting the wellbore and allowing the servicing fluid to set in place for a period of time; and
(d) repeating steps (a) through (c) until the permeability of a structure within the wellbore is reduced by about 50%.

22. The method of claim 21 wherein a pretreatment fluid comprising a calcium solution is introduced to the wellbore prior to step (a).

23. The method of claim 21, wherein the calcium source consists essentially of carbonate rocks; shale rocks; fractured or debonded cement surfaces; calcium carbonate formations; a cement column comprising Portland cement, calcium aluminate cement, calcium oxide cement, class C flyash cements, cement kiln dust cements, or combinations thereof; or combinations thereof.

24. The method of claim 21 wherein the wellbore servicing fluid further comprises an in-situ acid generating material.

* * * * *